US012500719B2

United States Patent
Wu et al.

(10) Patent No.: US 12,500,719 B2
(45) Date of Patent: Dec. 16, 2025

(54) TIME DETERMINING METHOD AND APPARATUS, TERMINAL, AND NETWORK DEVICE

(71) Applicant: VIVO MOBILE COMMUNICATION CO., LTD., Guangdong (CN)

(72) Inventors: Kai Wu, Guangdong (CN); Xiaodong Shen, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 480 days.

(21) Appl. No.: 17/983,864

(22) Filed: Nov. 9, 2022

(65) Prior Publication Data

US 2023/0072069 A1    Mar. 9, 2023

Related U.S. Application Data

(63) Continuation of application No. PCT/CN2021/091863, filed on May 6, 2021.

(30) Foreign Application Priority Data

May 9, 2020   (CN) .......................... 202010388622.1

(51) Int. Cl.
*H04L 5/00*     (2006.01)
*H04W 76/28*    (2018.01)

(52) U.S. Cl.
CPC .......... *H04L 5/0051* (2013.01); *H04L 5/0098* (2013.01); *H04W 76/28* (2018.02)

(58) Field of Classification Search
CPC ....... H04L 5/0051; H04L 5/0098; H04L 1/08; H04L 5/0078; H04L 5/0005;

(Continued)

(56) References Cited

U.S. PATENT DOCUMENTS

2018/0077688 A1    3/2018  Yi et al.
2020/0022139 A1    1/2020  Zhou et al.
(Continued)

FOREIGN PATENT DOCUMENTS

CN    104012163 A    8/2014
CN    111132330 A    5/2020

OTHER PUBLICATIONS

Extended European Search Report for Application No. 21803758.8, dated Sep. 22, 2023, 8 Pages.
(Continued)

*Primary Examiner* — Kiet Tang
(74) *Attorney, Agent, or Firm* — BROOKS KUSHMAN P.C.

(57) ABSTRACT

A time determining method and apparatus, a terminal, and a network device. The method includes: performing monitoring on a first physical downlink control channel PDCCH monitoring occasion in a plurality of PDCCH monitoring occasions, so as to detect a first PDCCH; and determining, based on a time of a reference PDCCH monitoring occasion in the plurality of PDCCH monitoring occasions, a start time of a first behavior corresponding to the first PDCCH; where the plurality of PDCCH monitoring occasions are monitoring occasions for performing repetition transmission of the first PDCCH; or information indicated by a plurality of PDCCHs is at least partially the same, where the plurality of PDCCHs are PDCCHs transmitted on the plurality of PDCCH monitoring occasions.

20 Claims, 6 Drawing Sheets

(58) Field of Classification Search
CPC ...... H04L 5/0053; H04L 5/001; H04W 76/28; H04W 72/232; H04W 68/005; H04W 68/02; H04W 72/23; H04W 72/0446; H04W 72/0457
See application file for complete search history.

(56) References Cited

U.S. PATENT DOCUMENTS

2020/0022144 A1* 1/2020 Papasakellariou .... H04L 5/0053
2022/0095353 A1* 3/2022 Liu ....................... H04W 72/23

OTHER PUBLICATIONS

Caict "Potential enhancements to PDCCH for URLLC" 3GPP TSG RAN WG1 Ad-Hoc Meeting 1901, Taipei, Jan. 2019, R1-1901129, 4 Pages.
Oppo, "The impacts of BWP switch delay" 3GPP TSG-RAN WG2 Meeting #104, Spokane, USA, Nov. 2018, R2-1816252, 6 Pages.
First Office Action for Japanese Application No. 2022-568476, dated Nov. 1, 2023, 3 Pages.
First Office Action for Indian Application No. 202227069709, dated Feb. 2, 2023, 6 Pages (including English Translation).
Intel Corporation, "5G NR PDCCH: Design and Performance", Santa Clara, USA, 2018, Fatemeh Hamidi-Sephehr et al., 6 pages.
International Search Report and Written Opinion for Application No. PCT/CN2021/091863, dated Jul. 15, 2021, 7 Pages.

* cited by examiner

TIME DETERMINING METHOD AND APPARATUS, TERMINAL, AND NETWORK DEVICE

CROSS-REFERENCE TO RELATED APPLICATIONS

This application is a continuation application of PCT International Application No. PCT/CN2021/091863 filed on May 6, 2021, which claims priority to Chinese Patent Application No. 202010388622.1, filed on May 9, 2020, which are incorporated herein by reference in their entireties.

TECHNICAL FIELD

This application relates to the field of communications technologies, and in particular, to a time determining method and apparatus, a terminal, and a network device.

BACKGROUND

In some communication systems, the network side may indicate some control information to terminals by using physical downlink control channel (PDCCH), and the terminal may perform a corresponding behavior according to such control information, for example, starting or restarting an inactivity timer, bandwidth part (BWP) switching, uplink transmission or downlink reception, or the like. However, currently, terminals all determine, based on a time of a PDCCH monitoring occasion (MO) on which a PDCCH is detected, a start time of a behavior corresponding to the PDCCH. During implementation of this application, the inventors have found that the network side may not be able to accurately know on which PDCCH monitoring occasion the terminal has detected the PDCCH, and as a result, the network side and the terminal have inconsistent understanding on the start time of the behavior corresponding to the PDCCH, affecting transmission performance between the terminal and the network side.

SUMMARY

According to a first aspect, an embodiment of this application provides a time determining method, applied to a terminal and including:
  performing monitoring on a first physical downlink control channel PDCCH monitoring occasion in a plurality of PDCCH monitoring occasions, so as to detect a first PDCCH; and
  determining, based on a time of a reference PDCCH monitoring occasion in the plurality of PDCCH monitoring occasions, a start time of a first behavior corresponding to the first PDCCH.
  The plurality of PDCCH monitoring occasions are monitoring occasions for performing repetition transmission of the first PDCCH; or
  information indicated by a plurality of PDCCHs is at least partially the same, where the plurality of PDCCHs are PDCCHs transmitted on the plurality of PDCCH monitoring occasions.

According to a second aspect, an embodiment of this application provides a time determining method, applied to a network device and including:
  sending a plurality of physical downlink control channels PDCCHs to a terminal on a plurality of PDCCH monitoring occasions, where the plurality of PDCCHs are PDCCH repetition transmissions, or information indicated by the plurality of PDCCHs is at least partially the same; and
  determining, based on a time of a reference PDCCH monitoring occasion in the plurality of PDCCH monitoring occasions, a start time of a first behavior corresponding to a first PDCCH and performed by the terminal; where
  the first PDCCH is any one PDCCH in the plurality of PDCCHs.

According to a third aspect, an embodiment of this application provides a time determining apparatus, applied to a terminal and including:
  a monitoring module, configured to perform monitoring on a first physical downlink control channel PDCCH monitoring occasion in a plurality of PDCCH monitoring occasions, so as to detect a first PDCCH; and
  a determining module, configured to determine, based on a time of a reference PDCCH monitoring occasion in the plurality of PDCCH monitoring occasions, a start time of a first behavior corresponding to the first PDCCH; where
  the plurality of PDCCH monitoring occasions are monitoring occasions for performing repetition transmission of the first PDCCH; or
  information indicated by a plurality of PDCCHs is at least partially the same, where the plurality of PDCCHs are PDCCHs transmitted on the plurality of PDCCH monitoring occasions.

According to a fourth aspect, an embodiment of this application provides a time determining apparatus, applied to a network device and including:
  a sending module, configured to send a plurality of physical downlink control channels PDCCHs to a terminal on a plurality of PDCCH monitoring occasions, where the plurality of PDCCHs are PDCCH repetition transmissions, or information indicated by the plurality of PDCCHs is at least partially the same; and
  a determining module, configured to determine, based on a time of a reference PDCCH monitoring occasion in the plurality of PDCCH monitoring occasions, a start time of a first behavior corresponding to a first PDCCH and performed by the terminal; where
  the first PDCCH is any one PDCCH in the plurality of PDCCHs.

According to a fifth aspect, an embodiment of this application provides a terminal, including a memory, a processor, and a program or an instruction stored in the memory and capable of running on the processor, where when the program or the instruction is executed by the processor, the steps of the time determining method on the terminal side provided in the embodiments of this application are implemented.

According to a sixth aspect, an embodiment of this application provides a network device, including a memory, a processor, and a program or an instruction stored in the memory and capable of running on the processor, where when the program or the instruction is executed by the processor, the steps of the time determining method on the network device side provided in the embodiments of this application are implemented.

According to a seventh aspect, an embodiment of this application provides a readable storage medium, where the readable storage medium stores a program or an instruction, and when the program or instruction is executed by a processor, the steps of the time determining method on the terminal side provided in the embodiments of this application are implemented; or when the program or instruction is executed by a processor, the steps of the time determining method on the network device side provided in the embodiments of this application are implemented.

According to an eighth aspect, an embodiment of this application provides a chip, including a processor and a communications interface, where the communications interface is coupled to the processor, and the processor is configured to run a program or an instruction to implement the steps of the time determining method on the terminal side provided in the embodiments of this application or the steps of the time determining method on the network device side provided in the embodiments of this application.

According to a ninth aspect, an embodiment of this application provides a computer program product, where the program product is stored in a non-volatile storage medium, and the program product is executed by at least one processor to implement the steps of the time determining method on the terminal side provided in the embodiments of this application or the steps of the time determining method on the network device side provided in the embodiments of this application.

DETAILED DESCRIPTION

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application without creative efforts shall fall within the protection scope of this application.

In the specification and claims of this application, the term "include" and any other variants thereof are intended to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device. In addition, in the specification and claims, the use of "and/or" represents presence of at least one of the connected objects, for example, "A and/or B" indicates the following three cases: A alone, B alone, or both A and B.

In the embodiments of this application, the terms "an example" or "for example" are used to represent an example, an illustration, or a description. Any embodiment or design scheme described as "an example" or "for example" in the embodiments of this application should not be construed as being more preferred or advantageous than other embodiments or design schemes. To be precise, the words such as "an example" or "for example" are intended to present a related concept in a specific manner.

The following describes the embodiments of this application with reference to the accompanying drawings. The determining method and apparatus, terminal, and network device provided in the embodiments of this application can be applied to a wireless communications system. The wireless communications system may be a new radio (NR) system, or other systems, such as an evolved long term evolution (eLTE) system, a long term evolution (LTE) system, or a later evolved communications system, further, may be applied to an unlicensed band in the wireless communications system.

Figure 1:
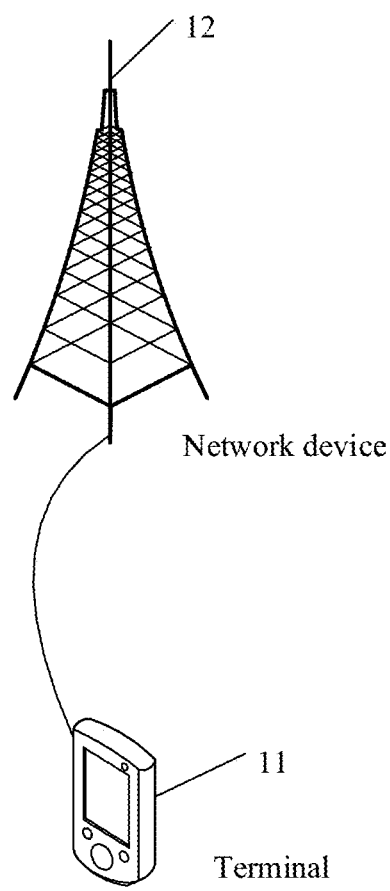
FIG. 1 is a structural diagram of a network system to which the embodiments of this application are applicable.

Referring to FIG. 1, FIG. 1 is a structural diagram of a network system to which the embodiments of this application are applicable. As shown in FIG. 1, the network system includes a terminal 11 and a network device 12. The terminal 11 may be a user terminal (User Equipment, UE) or another terminal-side device, for example, terminal-side devices such as a mobile phone, a tablet personal computer, a laptop computer, a personal digital assistant (PDA), a mobile Internet device (MID), or a wearable device. It should be noted that a specific type of the terminal 11 is not limited in this embodiment of this application. The network device 12 may be a 4G base station, a 5G base station, or a base station of a later version, or a base station in another communications system, or is referred to as a NodeB, or an evolved NodeB, or a transmission reception point (TRP), or an access point (AP), or other terms in the art. As long as a same technical effect is achieved, the network device is not limited to a specific technical term. In addition, the network device 12 may be a master node (MN) or a secondary node (SN). It should be noted that the 5G base station is used merely as an example in this embodiment of this application, rather than limiting a specific type of the network device.

Figure 2:
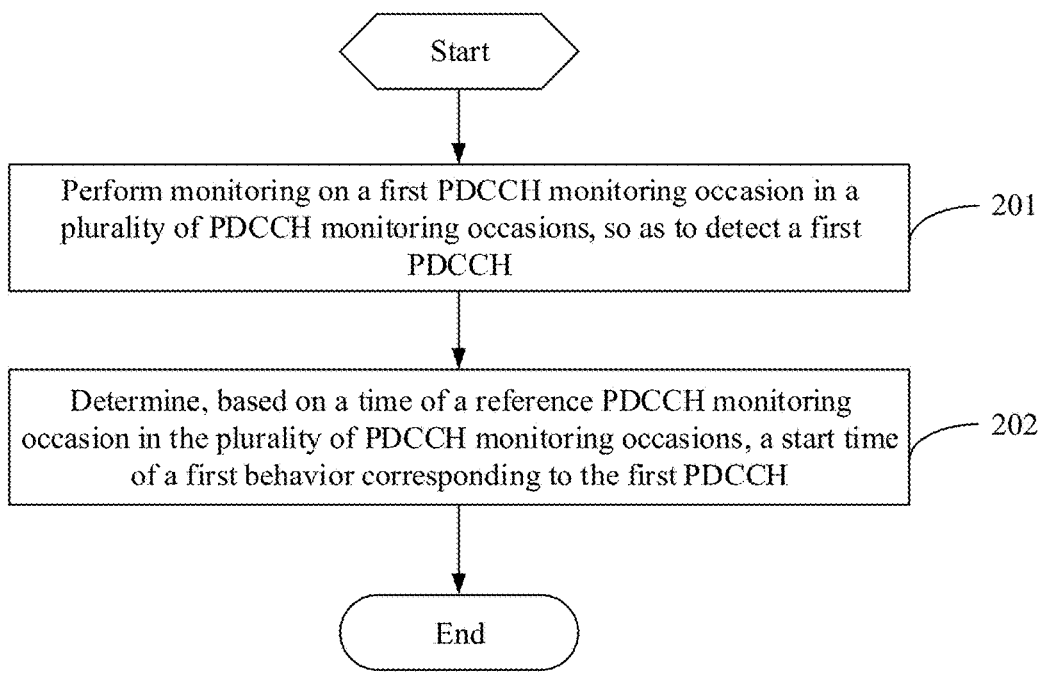
FIG. 2 is a flowchart of a time determining method according to an embodiment of this application.

Referring to FIG. 2, FIG. 2 is a flowchart of a time determining method according to an embodiment of this application. The method is applied to a terminal, and as shown in FIG. 2, includes the following steps.

Step 201: Perform monitoring on a first PDCCH monitoring occasion in a plurality of PDCCH monitoring occasions, so as to detect a first PDCCH.

The plurality of PDCCH monitoring occasions are monitoring occasions for performing repetition transmission of the first PDCCH; or information indicated by a plurality of PDCCHs is at least partially the same, where the plurality of PDCCHs are PDCCHs transmitted on the plurality of PDCCH monitoring occasions.

In this embodiment of this application, one PDCCH may be understood as one PDCCH signal or one PDCCH message.

The plurality of PDCCH monitoring occasions being monitoring occasions for performing repetition transmission of the first PDCCH may be that the plurality of PDCCH monitoring occasions is used for repetition transmission of the first PDCCH, that is, the network device performs repetition transmission of the first PDCCH on the plurality of PDCCH monitoring occasions.

Information indicated by the plurality of PDCCHs being at least partially the same may be that part or all of the information indicated by the plurality of PDCCHs may be the same. For example, scheduling information of the plurality of PDCCHs indicates same scheduling content, for example, the plurality of PDCCHs schedule a same physical downlink shared channel (PDSCH) for transmission, or schedules the terminal to transmit data on a same resource. For example, the plurality of PDCCH monitoring occasions are in different slots. However, PDCCHs transmitted on the plurality of PDCCH monitoring occasions all schedule the terminal to transmit data in a first slot, which may be specifically that values of scheduling offset indications (such as k0 or k2) of the PDCCHs transmitted on the plurality of PDCCH monitoring occasions are different. For another example, if the plurality of PDCCHs include scheduling information and other indication information, the scheduling information of the plurality of PDCCHs may be the same while the other indication information may be the same or different. Certainly, this embodiment of this application is not limited to the scheduling information being the same, for example, may be a switching indication, a timing indication, or an activation indication being the same.

It should be noted that the PDCCHs transmitted on the plurality of PDCCH monitoring occasions do not necessarily mean that the information indicated by the plurality of PDCCHs is exactly the same. It is acceptable that only part of the information is the same, or different information bits are sent and correspond to same indication information. For example, specific values of time offset information (k0) and time offset information (k2) indicated by the PDCCHs in different slots may be different, but correspond to a same resource for actual PDSCH or PUSCH transmission, where the time offset information (k0) is a time offset between a PDCCH and a scheduled PDSCH, and the time offset information (k2) is a time offset between a PDCCH and a scheduled PUSCH.

Figure 3:
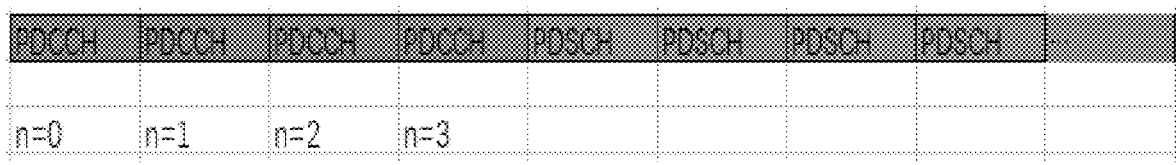
FIG. 3 is a schematic diagram of PDCCH repetition transmission according to an embodiment of this application.

For example, if the network configures the terminal to schedule the PDSCH in a manner of PDCCH repetition, where scheduling the PDSCH in the manner of PDCCH repetition can also be expressed as transmitting a plurality of PDCCHs to schedule same PDSCH transmission. The PDSCH transmission may be non-repeated PDSCH transmission or repeated PDSCH transmission, where redundancy versions (RV) of a plurality of PDSCHs for repeated transmission may be the same or different. As shown in FIG. 3, four PDSCHs are scheduled respectively by using four PDCCHs, where the four PDSCHs are a same PDSCH transmission.

The first PDCCH monitoring occasion may be any PDCCH monitoring occasion in the plurality of PDCCH monitoring occasions, such as a PDCCH monitoring occasion on which a PDCCH is detected for the first time in the plurality of PDCCH monitoring occasions. The first PDCCH may be a PDCCH detected by the terminal in the plurality of PDCCH monitoring occasions. For example, the terminal detects a PDCCH on the first PDCCH monitoring occasion in the plurality of PDCCH monitoring occasions, and the PDCCH monitoring occasion is the foregoing first PDCCH monitoring occasion. The PDCCH is the first PDCCH, and the terminal may or may not perform monitoring on other PDCCH monitoring occasions.

Step 202: Determine, based on a time of a reference PDCCH monitoring occasion in the plurality of PDCCH monitoring occasions, a start time of a first behavior corresponding to the first PDCCH.

The reference PDCCH monitoring occasion in the plurality of PDCCH monitoring occasions may be a PDCCH monitoring occasion determined in a manner such as being preconfigured by the network device or being specified by a protocol.

The determining, based on a time of a reference PDCCH monitoring occasion in the plurality of PDCCH monitoring occasions, a start time of a first behavior corresponding to the first PDCCH may be using the time of the reference PDCCH monitoring occasion in the plurality of PDCCH monitoring occasions as a reference to determine the start time of the first behavior corresponding to the first PDCCH.

The first behavior may be a behavior performed by the terminal and corresponding to information indicated by the first PDCCH, such as starting or restarting an inactivity timer, BWP switching, or uplink transmission or downlink reception.

In this embodiment of this application, the start time of the first behavior corresponding to the first PDCCH is determined based on the time of the reference PDCCH monitoring occasion in the plurality of PDCCH monitoring occasions, so that the network side and the terminal have consistent understanding on the start time of the behavior corresponding to the PDCCH. In other words, the network device may also determine, based on the time of the reference PDCCH monitoring occasion in the plurality of PDCCH monitoring occasions, the time of the first behavior corresponding to the first PDCCH and performed by the terminal, thereby improving transmission performance between the terminal and the network side.

In an optional implementation, the first behavior includes at least one of the following:
starting or restarting an inactivity timer;
BWP switching;
activating a Scell;
uplink transmission or downlink reception as scheduled by the first PDCCH;
changing a minimum scheduling offset indication (minimumSchedulingOffset); or search space set switching.

The inactivity timer may include at least one of the following:
a BWP inactivity timer (bwpInactivityTimer);
a secondary cell (Scell) inactivity timer; or
a discontinuous reception inactivity timer (drxInactivityTimer).

Certainly, the inactivity timer may alternatively be other inactivity timers, which is not limited.

The BWP switching may be for an active BWP.

The minimum scheduling offset indication may be a minimum scheduling offset indication allowed by the terminal or configured for the terminal by the network, or may be a minimum scheduling offset indication on the BWP, for example, a minimum value of k0 or k2 on the BWP, where k0 is a slot offset between the PDCCH and a scheduled PDSCH/channel state information-reference signal (CSI-RS), and k2 is a slot offset between the PDCCH and a scheduled PUSCH/sounding reference signal (SRS).

The search space set switching may be search space set group switching.

Further, a start time of starting or restarting the inactivity timer may be a start or restart time of the inactivity timer; a start time of BWP switching may be a switching time of BWP switching; a start time of activating the Scell may be an activation time of activating the Scell; a start time of uplink transmission or downlink reception scheduled by the first PDCCH may be a transmission time of uplink transmission scheduled by the first PDCCH or a reception time of downlink reception scheduled by the first PDCCH; a time of changing the minimum scheduling offset indication may be a change time of the minimum scheduling offset indication or a validation time of the minimum scheduling offset indication; and a start time of the search space set switching may be a validation time of the search space set switching.

It should be noted that the first behavior in this embodiment of this application does not constitute any limitation on the foregoing behavior, for example, may alternatively be starting or restarting an activation timer, which is not limited.

In an optional implementation, in a case that the first behavior includes the BWP switching, or includes starting or restarting a BWP inactivity timer, the determining, based on a time of a reference PDCCH monitoring occasion in the plurality of PDCCH monitoring occasions, a start time of a first behavior corresponding to the first PDCCH includes:

determining, based on the time of the reference PDCCH monitoring occasion in the plurality of PDCCH monitoring occasions and a BWP switching delay, the start time of the first behavior corresponding to the first PDCCH, where the start time of the first behavior includes one of the following:

a switching time of the BWP switching; or a start or restart time of the BWP inactivity timer.

The BWP switching delay may be preconfigured or predefined, for example, corresponding to a time corresponding to a BWP switching delay capability reported by the terminal.

The determining, based on the time of the reference PDCCH monitoring occasion in the plurality of PDCCH monitoring occasions and a BWP switching delay, the start time of the first behavior corresponding to the first PDCCH may be determining one or more start times of the first behavior based on the time of the reference PDCCH monitoring occasion in the plurality of PDCCH monitoring occasions and the BWP switching delay, and then determining a final start time from the one or more start times.

For example, if the network configures the terminal to monitor a PDCCH that indicates a wake up indication or a secondary cell dormancy indication (Scell dormancy indication), and configures the plurality of PDCCH monitoring occasions for PDCCH monitoring, the terminal determines a switching time of the active BWP of the Scell based on both a reported BWP switching delay and the reference PDCCH monitoring occasion.

Optionally, the switching time of the BWP switching or the start or restart time of the BWP inactivity timer includes:

an earlier or later one of a first time and a second time; where the first time is X symbols, slots, or subframes before a start time of the discontinuous reception inactivity timer (drxInactivityTimer), and the second time is the time of the reference PDCCH monitoring occasion; and X corresponds to the BWP switching delay.

In this implementation, the first time and the second time may be determined based on the time of the reference PDCCH monitoring occasion in the plurality of PDCCH monitoring occasions and the BWP switching delay, and then an earlier or later one of the first time and the second time may be determined as the start time of the first behavior. In this way, the time of BWP switching can be advanced or delayed to meet requirements of a current service or scenario of the terminal.

For example, the time when BWP switching is performed or the BWP inactivity timer starts to run is: an earlier or later slot, symbol, or subframe of the X slots/symbols/subframes before the start time of the discontinuous reception inactivity timer and a slot/symbol/subframe corresponding to the reference PDCCH monitoring occasion. The slot corresponding to the reference PDCCH monitoring occasion may be a slot in which the monitoring occasion is located, or a slot next to the slot in which the monitoring occasion is located.

Optionally, the start time of the discontinuous reception inactivity timer is a start time that is determined based on the time of the reference PDCCH monitoring occasion. Certainly, this is not limited. For example, the start time of the discontinuous reception inactivity timer may alternatively be a start time, determined based on other PDCCHs, of the discontinuous reception inactivity timer.

In an optional implementation, in a case that the first PDCCH includes a scheduling offset indication and the first behavior includes performing uplink transmission or downlink reception scheduled by the first PDCCH, the determining, based on a time of a reference PDCCH monitoring occasion in the plurality of PDCCH monitoring occasions, a start time of a first behavior corresponding to the first PDCCH includes:

determining a third time after the time of the reference PDCCH monitoring occasion in the plurality of PDCCH monitoring occasions as the start time of the first behavior corresponding to the first PDCCH, where a time interval between the third time and the time of the reference PDCCH monitoring occasion is an offset time indicated by the scheduling offset indication.

The scheduling offset indication may be k0, k2, or the like.

In this implementation, uplink transmission or downlink reception scheduled by the first PDCCH can be performed at the third time after the time of the reference PDCCH monitoring occasion, so that the network side can perform reception or transmission at the corresponding time.

In an optional implementation, in a case that the first PDCCH indicates a minimum scheduling offset indication, and the first behavior includes changing a minimum scheduling offset:

the determining, based on a time of a reference PDCCH monitoring occasion in the plurality of PDCCH monitoring occasions, a start time of a first behavior corresponding to the first PDCCH includes:

determining a fourth time after the time of the reference PDCCH monitoring occasion as a start time of changing a minimum scheduling offset of the terminal to a minimum scheduling offset indicated by the first PDCCH, where the fourth time is the same as the minimum scheduling offset indicated by the first PDCCH, and a time interval between the fourth time and the time of the reference PDCCH monitoring occasion is equal to a validation time of an updated scheduling offset indication that is pre-obtained.

The start time of changing the minimum scheduling offset of the terminal to the minimum scheduling offset indicated by the first PDCCH may be understood as a validation time of the minimum scheduling offset indication indicated by the first PDCCH. In addition, before the validation time, a minimum scheduling offset currently being used by the terminal is still a minimum scheduling offset indication not yet updated, so as to ensure that the terminal and the network side have consistent understanding on the start time of changing the minimum scheduling offset.

In an optional implementation, the time of the reference PDCCH monitoring occasion includes one of the following:
   a start symbol or end symbol of the reference PDCCH monitoring occasion;
   a slot or subframe in which the reference PDCCH monitoring occasion is located; or
   a next symbol, next slot, or next subframe of the reference PDCCH monitoring occasion.

The start symbol or end symbol of the reference PDCCH monitoring occasion may be a start symbol or end symbol of a slot or subframe in which the reference PDCCH monitoring occasion is located.

The next symbol of the reference PDCCH monitoring occasion may be a next symbol after the slot or subframe in which the reference PDCCH monitoring occasion is located; the next slot of the reference PDCCH monitoring occasion may be a next slot after the slot or subframe in which the reference PDCCH monitoring occasion is located; and the next subframe of the reference PDCCH monitoring occasion may be a next subframe after the slot or subframe in which the reference PDCCH monitoring occasion is located.

In an optional implementation, the reference PDCCH monitoring occasion is a last monitoring occasion in the plurality of PDCCH monitoring occasions; or
   the reference PDCCH monitoring occasion is a last monitoring occasion in valid monitoring occasions of the plurality of PDCCH monitoring occasions.

The last monitoring occasion in the plurality of PDCCH monitoring occasions may be the last one of the plurality of PDCCH monitoring occasions in a time period, for example, the last one of a plurality of repetition transmissions of one PDCCH transmission in a time period. The last monitoring occasion in the valid monitoring occasions of the plurality of PDCCH monitoring occasions may be the last valid monitoring occasion of the plurality of PDCCH monitoring occasions within a time period, such as a valid monitoring occasion of a plurality of repetition transmissions of one PDCCH transmission in a time period.

Certainly, the last monitoring occasion in the plurality of PDCCH monitoring occasions may be the last monitoring occasion in the plurality of PDCCH monitoring occasions. For example, if the plurality of PDCCH monitoring occasions are N PDCCH monitoring occasions, the last monitoring occasion may be the N-th PDCCH monitoring occasion. The last monitoring occasion in the valid monitoring occasions of the plurality of PDCCH monitoring occasions may be the last valid monitoring occasion in the plurality of PDCCH monitoring occasions.

Optionally, the valid monitoring occasion is a monitoring occasion that does not meet at least one of the following conditions:
   the PDCCH monitoring occasion includes an uplink symbol or a flexible symbol (UL symbol or flexible symbol) indicated by a slot format indication (SFI);
   the PDCCH monitoring occasion overlaps in time other PDCCH monitoring occasions in control resource sets (CORESET) having different transmission configuration indicator states (TCI state);
   the PDCCH monitoring occasion is not monitored by the terminal according to priority;
   the PDCCH monitoring occasion overlaps a synchronization signal block (SSB) or CSI-RS measurement time, or the PDCCH monitoring occasion overlaps a measurement gap configured by higher-layer signaling, where the measurement includes at least one of the following: radio resource management (RRM) measurement, radio link monitoring (RLM) measurement, beam failure detection (BFD) measurement, candidate beam detection measurement, CSI measurement, and layer 1 reference signal received power (L1-Reference Signal Receiving Power, L1-RSRP) measurement; or RRM measurement includes intra-frequency (intra-freq) measurement and inter-frequency (inter-freq) measurement; or
   the PDCCH monitoring occasion overlaps a random access response monitoring window (RAR monitoring window) or is present during running of a random access contention resolution timer (ra-Contention Resolution Timer).

During beam failure recovery, a PDCCH scrambled by a cell-radio network temporary identifier (C-RNTI) or a modulation and coding scheme (Modulation and Coding Scheme Cell-Radio Network Temporary Identifier, MCS-C-RNTI) is monitored on a PDCCH monitoring occasion, where the PDCCH monitoring occasion may be a PDCCH monitoring occasion configured in a recovery search space.

It can also be understood that the PDCCH monitoring occasion corresponding to at least one of the foregoing is an invalid monitoring occasion.

In an optional implementation, the plurality of PDCCH monitoring occasions are a plurality of PDCCH monitoring occasions indicated by a search space set that is configured by the network side.

The plurality of PDCCH monitoring occasions indicated by the search space set that is configured by the network side may be a plurality of PDCCH monitoring occasions indicated by the search space set based on an RRC configuration value. Certainly, this is not limited, for example, a plurality of PDCCH monitoring occasions may alternatively be configured in other manners.

Optionally, when the network device configures the plurality of PDCCH monitoring occasions (that is, configures PDCCH repetition, or the network configures the UE to receive, in a plurality of PDCCH monitoring occasions, PDCCHs indicating same information), the network device configures a start slot or a start monitoring occasion of PDCCH monitoring, and also configures PDCCH repetition to be transmitted for N times starting from the start position. Alternatively, technical information of a PDCCH repetition count is included in the PDCCH, for example, n=0, 1, 2, . . . , and N−1, which respectively represent that the PDCCH is the 1st, 2nd, . . . , and N-th transmissions of repetition transmission, or is a transmission in the 1st, 2nd, . . . , and N-th monitoring occasions of N monitoring occasions.

In this implementation, the number of the plurality of PDCCH monitoring occasions can be accurately determined, so as to accurately determine the reference PDCCH. Certainly, this is not limited in this application, for example, the number of the plurality of PDCCH monitoring occasions can alternatively be determined according to a protocol.

Further, the terminal may not perform PDCCH monitoring during invalid monitoring occasions. Therefore, in this application, a monitoring occasion on which PDCCH monitoring can be performed may be referred to as a valid monitoring occasion. For an invalid monitoring occasion, reference may be made to the description of the foregoing implementation, and details are not repeated herein. In addition, in a case that PDCCH monitoring cannot be performed, and the network configures, for the terminal, PDCCH repetition or monitoring in a plurality of PDCCH monitoring occasions, the terminal may accordingly perform a monitoring behavior:

the terminal continues to monitor a next PDCCH monitoring occasion until the preset N-th PDCCH monitoring is completed; or the terminal performs monitoring in N MOs starting from an initial PDCCH monitoring occasion, and skips monitoring if monitoring cannot be performed for the foregoing reasons.

The reference PDCCH monitoring occasion may be the last MO in the N PDCCH monitoring occasions, or the last valid PDCCH monitoring occasion in the N PDCCH monitoring occasions.

It should be noted that, in this embodiment of this application, in the reference PDCCH monitoring occasion, the terminal may not perform monitoring, or may not necessarily be able to detect a PDCCH and may detect the PDCCH in other PDCCH monitoring occasions. However, the reference PDCCH monitoring occasion is used as a reference time point for executing a corresponding terminal behavior.

In this embodiment of this application, monitoring is performed on the first physical downlink control channel PDCCH monitoring occasion in the plurality of PDCCH monitoring occasions, so as to detect the first PDCCH; and the start time of the first behavior corresponding to the first PDCCH is determined based on the time of the reference PDCCH monitoring occasion in the plurality of PDCCH monitoring occasions. The plurality of PDCCH monitoring occasions are monitoring occasions for performing repetition transmission of the first PDCCH; or information indicated by the PDCCHs that are transmitted on the plurality of PDCCH monitoring occasions is at least partially the same. In this way, the start time of the first behavior corresponding to the first PDCCH can be determined based on the time of the reference PDCCH monitoring occasion in the plurality of PDCCH monitoring occasions, so that the network side and the terminal have consistent understanding on the start time of the behavior corresponding to the PDCCH, thereby improving transmission performance between the terminal and the network side.

Figure 4:
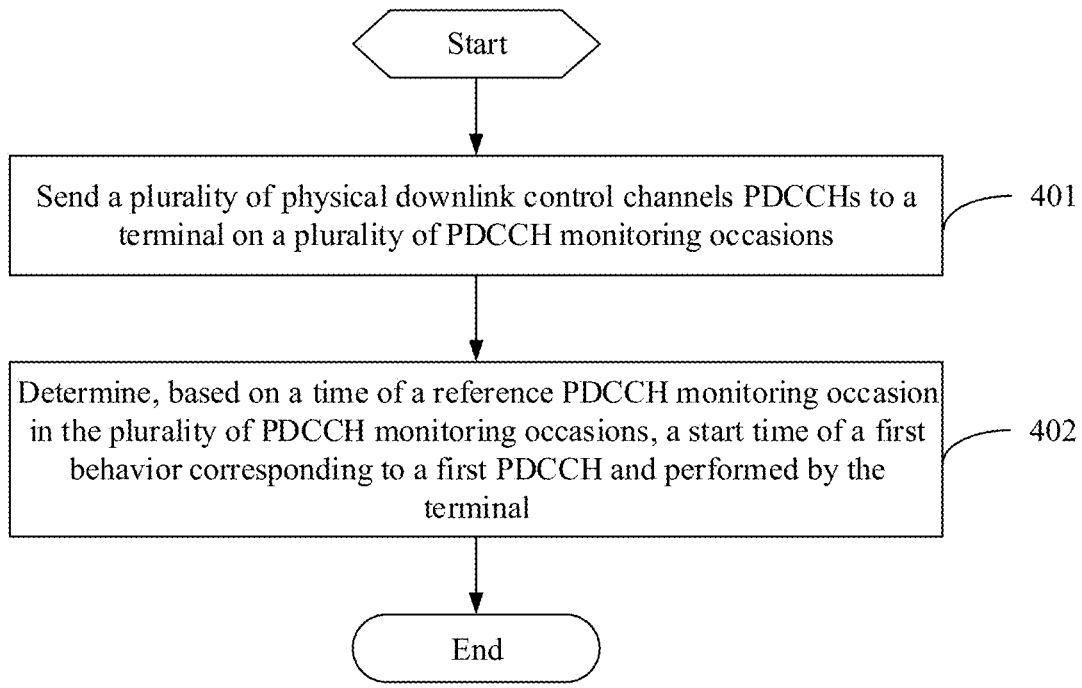
FIG. 4 is a flowchart of another time determining method according to an embodiment of this application.

Referring to FIG. 4, FIG. 4 is a flowchart of another time determining method according to an embodiment of this application. The method is applied to a network device, and as shown in FIG. 4, includes the following steps.

Step 401: Send a plurality of physical downlink control channels PDCCHs to a terminal on a plurality of PDCCH monitoring occasions, where the plurality of PDCCHs are PDCCH repetition transmissions, or information indicated by the plurality of PDCCHs is at least partially the same.

Step 402: Determine, based on a time of a reference PDCCH monitoring occasion in the plurality of PDCCH monitoring occasions, a start time of a first behavior corresponding to a first PDCCH and performed by the terminal.

The first PDCCH is any one PDCCH in the plurality of PDCCHs.

Optionally, the first behavior includes at least one of the following:

starting or restarting an inactivity timer;

activating a secondary cell Scell;

bandwidth part BWP switching;

uplink transmission or downlink reception as scheduled by the first PDCCH;

changing a minimum scheduling offset indication; or search space set switching.

Optionally, the inactivity timer includes at least one of the following:

a BWP inactivity timer;

a secondary cell Scell inactivity timer; or a discontinuous reception inactivity timer.

Optionally, in a case that the first behavior includes the BWP switching, or includes starting or restarting a BWP inactivity timer:

the determining, based on a time of a reference PDCCH monitoring occasion in the plurality of PDCCH monitoring occasions, a start time of a first behavior corresponding to a first PDCCH and performed by the terminal includes:

determining, based on the time of the reference PDCCH monitoring occasion in the plurality of PDCCH monitoring occasions and a BWP switching delay, the start time of the first behavior corresponding to the first PDCCH and performed by the terminal, where the start time of the first behavior includes one of the following:

a switching time of the BWP switching; or a start or restart time of the BWP inactivity timer.

Optionally, the switching time of the BWP switching or the start or restart time of the BWP inactivity timer includes:

an earlier or later one of a first time and a second time; where the first time is X symbols, slots, or subframes before a start time of the discontinuous reception inactivity timer, and the second time is the time of the reference PDCCH monitoring occasion; and X corresponds to the BWP switching delay.

Optionally, the start time of the discontinuous reception inactivity timer is a start time that is determined based on the time of the reference PDCCH monitoring occasion.

Optionally, in a case that the first PDCCH includes a scheduling offset indication and the first behavior includes performing uplink transmission or downlink reception scheduled by the first PDCCH:

the determining, based on a time of a reference PDCCH monitoring occasion in the plurality of PDCCH monitoring occasions, a start time of a first behavior corresponding to a first PDCCH and performed by the terminal includes:

determining a third time after the time of the reference PDCCH monitoring occasion in the plurality of PDCCH monitoring occasions as the start time of the first behavior corresponding to the first PDCCH and performed by the terminal, where a time interval between the third time and the time of the reference PDCCH monitoring occasion is an offset time indicated by the scheduling offset indication.

Optionally, in a case that the first PDCCH indicates a minimum scheduling offset indication, and the first behavior includes changing a minimum scheduling offset:

the determining, based on a time of a reference PDCCH monitoring occasion in the plurality of PDCCH monitoring occasions, a start time of a first behavior corresponding to a first PDCCH and performed by the terminal includes:

determining a fourth time after the time of the reference PDCCH monitoring occasion as a start time of changing a minimum scheduling offset of the terminal to a minimum scheduling offset indicated by the first PDCCH, where the fourth time is the same as the minimum scheduling offset indicated by the first PDCCH, and a time interval between the fourth time and the time of the reference PDCCH monitoring occasion is equal to a validation time of an updated scheduling offset indication that is pre-obtained.

Optionally, the time of the reference PDCCH monitoring occasion includes one of the following:

- a start symbol or end symbol of the reference PDCCH monitoring occasion;
- a slot or subframe in which the reference PDCCH monitoring occasion is located; or
- a next symbol, next slot, or next subframe of the reference PDCCH monitoring occasion.

Optionally, the reference PDCCH monitoring occasion is a last monitoring occasion in the plurality of PDCCH monitoring occasions; or the reference PDCCH monitoring occasion is a last monitoring occasion in valid monitoring occasions of the plurality of PDCCH monitoring occasions.

Optionally, the plurality of PDCCH monitoring occasions are a plurality of PDCCH monitoring occasions indicated by a search space set that is configured by a network side.

It should be noted that this embodiment is an implementation of the network device side corresponding to the embodiment shown in FIG. 2. For the specific implementation, reference may be made to the related description of the embodiment shown in FIG. 2. To avoid repeated descriptions, details are not repeated in this embodiment. In this embodiment, the terminal can also obtain HARQ-ACK related information.

The following uses a plurality of embodiments to describe the time determining method provided in the embodiments of this application by using examples, which may include the following:

Embodiment 1

This embodiment uses BWP switching being indicated by a scheduling PDCCH as an example for description:

For the PDCCH that includes a bandwidth part indicator field, if a BWP different from a current active BWP is indicated, the terminal switches to the new BWP. If the network has configured PDCCH repetition, or the network has configured the terminal to receive, in a plurality of PDCCH MOs, PDCCHs indicating same information (or indicating partially same information), N PDCCH transmissions or monitorings are performed. Then, after detecting any one PDCCH in the N PDCCH MOs, the terminal performs BWP switching on the reference PDCCH MO, that is, starts or restarts the bwpInactivityTimer from the subframe or slot in which the reference PDCCH MO is located.

A time point at which the terminal starts to perform BWP switching or a time point at which the bwpInactivityTimer is started or restarted may be determined by using a time of the reference PDCCH MO as a reference time point. The time of the reference PDCCH MO may include one of the following:

- a start symbol, an end symbol, and a next symbol of the end symbol; or
- a current slot or subframe, a next slot, or a next subframe.

The reference PDCCH MO may be:

- the last MO in N MOs; or
- the last valid MO in N MOs.

Embodiment 2

A PDCCH scrambled by a power saving radio network temporary identifier (PS-RNTI), that is, DCI format-2-6, not only indicates whether drxInactivityTimer is started in a next DRX cycle in a primary cell (PCell) or a primary secondary cell (PSCell), and also indicates that an active BWP of the Scell is a dormant BWP or a non-dormant BWP. In this case, when the terminal detects the PDCCH, and the active BWP indicated in the PDCCH is different from the current active BWP, the terminal also performs BWP switching in the Scell. The network may configure the N PDCCH MOs of the PDCCH in at least one CORESET and at least one search space set. If the terminal detects the PDCCH in any one of N≥1 MO, the terminal performs BWP switching after the reference PDCCH MO.

A time point at which the terminal starts to perform BWP switching or a time point at which the bwpInactivityTimer is started or restarted may be determined by using a reference occasion of the reference PDCCH MO as a reference time point. For the determining method, refer to the embodiment shown in FIG. 2.

Figure 5:
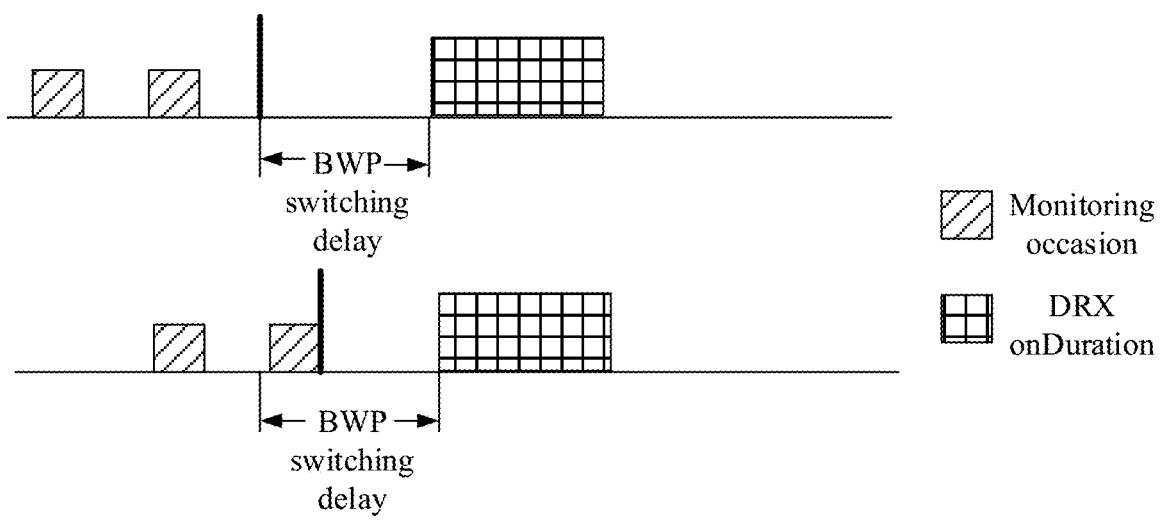
FIG. 5 is a schematic diagram of time determining according to an embodiment of this application.

Optionally, after detecting the PDCCH scrambled by the PS-RNTI, the terminal may advance or delay the time of BWP switching as much as possible. For example, the time at which BWP switching is performed or the bwpInactivityTimer starts to run is an earlier or later slot, symbol, or subframe in X slots, symbols, or subframes before the start time of drxInactivityTimer and the determined time of the reference PDCCH MO. For example, as shown in FIG. 5, a later time point is used as the time at which BWP switching is performed or the bwpInactivityTimer starts to run.

In addition, the determined time of the reference PDCCH MO may be a reference occasion, which may specifically be one of the following:

- a start symbol, an end symbol, and a next symbol of the end symbol; or
- a current slot or subframe, a next slot, or a next subframe.

The reference PDCCH MO may be:

- the last MO in N MOs; or
- the last valid MO in N MOs.

If BWP switching is performed at an earlier time point, BWP switching can be completed earlier to implement transmission or reception; or when BWP switching is performed at a later time, the purpose of saving power of the terminal can be achieved.

Embodiment 3

If DRX is configured for the terminal and the terminal detects a PDCCH for PDSCH scheduling or PUSCH scheduling within an active time of DRX, the terminal starts or restarts the drxInactivityTimer. If the network configures PDCCH repetition, or the network configures the terminal to receive, in a plurality of PDCCH monitoring occasions (MO), PDCCHs indicating same information (or indicating partially same information), performs N PDCCH transmissions or monitorings are performed. Then, after detecting any one PDCCH in the N PDCCH monitoring occasions, the terminal determines, at the time of the reference PDCCH MO, the time of starting or restarting the drxInactivityTimer.

The time of the reference PDCCH MO may include one of the following:

- a start symbol, an end symbol, and a next symbol of the end symbol; or
- a current slot or subframe, a next slot, or a next subframe.

The reference PDCCH MO may be:

- the last MO in N MOs; or
- the last valid MO in N MOs.

Embodiment 4

The network may configure a minimum scheduling offset indication (minimumSchedulingOffset) for the terminal, and the signaling is used to indicate a minimum value of k0 or k2 on the BWP, where k0 is a slot offset between the PDCCH and the scheduled PDSCH/CSI-RS, and k2 is a slot offset of the PDCCH and the scheduled PUSCH/SRS. If the terminal receives the configuration, scheduling DCI includes a minimum scheduling offset indication. If the minimum scheduling offset indication is different from a current minimum scheduling offset indication, the terminal uses the updated minimum scheduling offset indication according to the indication in a time T after reception of the indication. In other words, before the time T, an unupdated minimum scheduling offset indication is still used. That is, the time T is a validation time of the updated minimum scheduling offset time.

If the network configures PDCCH repetition, or the network configures the terminal to receive, in a plurality of PDCCH monitoring occasions (MO), PDCCHs indicating same information (or indicating partially same information), N PDCCH transmissions or monitorings are performed. Then, after detecting any one PDCCH in the N PDCCH MOs, the terminal determines, based on the time of the reference PDCCH MO, that the updated minimum scheduling offset value takes effect after the time T. That is, the updated minimum scheduling offset indication is used after the time T to determine a time offset of a PDSCH or PUSCH resource relative to the reference PDCCH MO.

The time of the reference PDCCH MO may include one of the following:
  a start symbol, an end symbol, and a next symbol of the end symbol; or
  a current slot or subframe, a next slot, or a next subframe.

The reference PDCCH MO may be:
  the last MO in N MOs; or
  the last valid MO in N MOs.

Embodiment 5

The network may configure for the terminal search space set group switching, that is, configures a plurality of SS set groups, and the network indicates, by using the PDCCH, the terminal to switch the SS set group. The SS set group includes at least one SS set. After the terminal detects the PDCCH, and in a case that an SS set group indicated by the PDCCH is different from an SS set group in the PDCCH being currently monitored by the terminal, the terminal performs PDCCH monitoring after the time T by using a configuration of an SS set in the SS set group indicated by the PDCCH, and stops using a configuration of an SS set in an SS set group not indicated by the PDCCH. That is, before the time T, an SS set of an unupdated SS set group is still used for PDCCH monitoring. In other words, the time T is a validation time of the updated SS set group.

If the network configures PDCCH repetition, or the network configures the terminal to receive, in a plurality of PDCCH monitoring occasions (MO), PDCCHs indicating same information (or indicating partially same information), N PDCCH transmissions or monitorings are performed. Then, after detecting any one PDCCH in the N PDCCH MOs, the UE determines, based on the time of the reference PDCCH MO, that the updated SS set group takes effect after the time T. That is, a configuration of an SS set of the updated SS set group indicated by the PDCCH is used for PDCCH monitoring after the time T.

The time of the reference PDCCH MO may include one of the following:
  a start symbol, an end symbol, and a next symbol of the end symbol; or
  a current slot or subframe, a next slot, or a next subframe.

The reference PDCCH MO may be:
  the last MO in N MOs; or
  the last valid MO in N MOs.

In this embodiment of this application, the start time of the terminal behavior and the time at which various timers start to run may be determined based on the reference PDCCH monitoring occasion for PDCCH repetition. In this way, in a case that the network is not sure on which PDCCH occasion the terminal detects the PDCCH, the network and the terminal have clear understanding on the execution time of the terminal behavior based on the reference PDCCH monitoring occasion.

Figure 6:
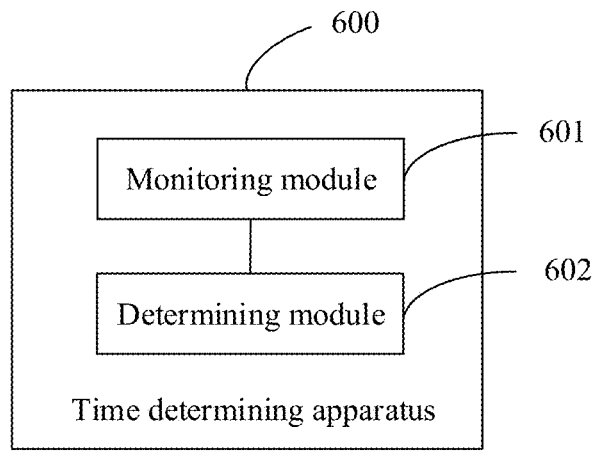
FIG. 6 is a structural diagram of a time determining apparatus according to an embodiment of this application.

Referring to FIG. 6, FIG. 6 is a structural diagram of a time determining apparatus according to an embodiment of this application. The apparatus is applied to a terminal, and as shown in FIG. 6, the time determining apparatus 600 includes:
  a monitoring module 601, configured to perform monitoring on a first physical downlink control channel PDCCH monitoring occasion in a plurality of PDCCH monitoring occasions, so as to detect a first PDCCH; and
  a determining module 602, configured to determine, based on a time of a reference PDCCH monitoring occasion in the plurality of PDCCH monitoring occasions, a start time of a first behavior corresponding to the first PDCCH; where
  the plurality of PDCCH monitoring occasions are monitoring occasions for performing repetition transmission of the first PDCCH; or
  information indicated by a plurality of PDCCHs is at least partially the same, where the plurality of PDCCHs are PDCCHs transmitted on the plurality of PDCCH monitoring occasions.

Optionally, the first behavior includes at least one of the following:
  starting or restarting an inactivity timer;
  bandwidth part BWP switching;
  activating a secondary cell Scell;
  uplink transmission or downlink reception as scheduled by the first PDCCH;
  changing a minimum scheduling offset indication; or
  search space set switching.

Optionally, the inactivity timer includes at least one of the following:
  a BWP inactivity timer;
  a secondary cell Scell inactivity timer; or
  a discontinuous reception inactivity timer.

Optionally, in a case that the first behavior includes the BWP switching, or includes starting or restarting a BWP inactivity timer:
  the determining module 602 is configured to determine, based on the time of the reference PDCCH monitoring occasion in the plurality of PDCCH monitoring occasions and a BWP switching delay, the start time of the first behavior corresponding to the first PDCCH, where the start time of the first behavior includes one of the following:
  a switching time of the BWP switching; or
  a start or restart time of the BWP inactivity timer.

Optionally, the switching time of the BWP switching or the start or restart time of the BWP inactivity timer includes:

an earlier or later one of a first time and a second time; where the first time is X symbols, slots, or subframes before a start time of the discontinuous reception inactivity timer, and the second time is the time of the reference PDCCH monitoring occasion; and X corresponds to the BWP switching delay.

Optionally, the start time of the discontinuous reception inactivity timer is a start time that is determined based on the time of the reference PDCCH monitoring occasion.

Optionally, in a case that the first PDCCH includes a scheduling offset indication and the first behavior includes performing uplink transmission or downlink reception scheduled by the first PDCCH:

the determining module 602 is configured to determine a third time after the time of the reference PDCCH monitoring occasion in the plurality of PDCCH monitoring occasions as the start time of the first behavior corresponding to the first PDCCH, where a time interval between the third time and the time of the reference PDCCH monitoring occasion is an offset time indicated by the scheduling offset indication.

Optionally, in a case that the first PDCCH indicates a minimum scheduling offset indication, and the first behavior includes changing a minimum scheduling offset:

the determining module 602 is configured to determine a fourth time after the time of the reference PDCCH monitoring occasion as a start time of changing a minimum scheduling offset of the terminal to a minimum scheduling offset indicated by the first PDCCH, where the fourth time is the same as the minimum scheduling offset indicated by the first PDCCH, and a time interval between the fourth time and the time of the reference PDCCH monitoring occasion is equal to a validation time of an updated scheduling offset indication that is pre-obtained.

Optionally, the time of the reference PDCCH monitoring occasion includes one of the following:

a start symbol or end symbol of the reference PDCCH monitoring occasion;

a slot or subframe in which the reference PDCCH monitoring occasion is located; or a next symbol, next slot, or next subframe of the reference PDCCH monitoring occasion.

Optionally, the reference PDCCH monitoring occasion is a last monitoring occasion in the plurality of PDCCH monitoring occasions; or the reference PDCCH monitoring occasion is a last monitoring occasion in valid monitoring occasions of the plurality of PDCCH monitoring occasions.

Optionally, the plurality of PDCCH monitoring occasions are a plurality of PDCCH monitoring occasions indicated by a search space set that is configured by a network side.

The time determining apparatus provided in this embodiment of this application can implement the processes of the method embodiment of FIG. 2. To avoid repetition, details are not repeated herein. Transmission performance between the terminal and the network side can be improved.

It should be noted that the time determining apparatus in this embodiment of this application may be an apparatus, or may be a component, an integrated circuit, or a chip in a terminal.

Figure 7:
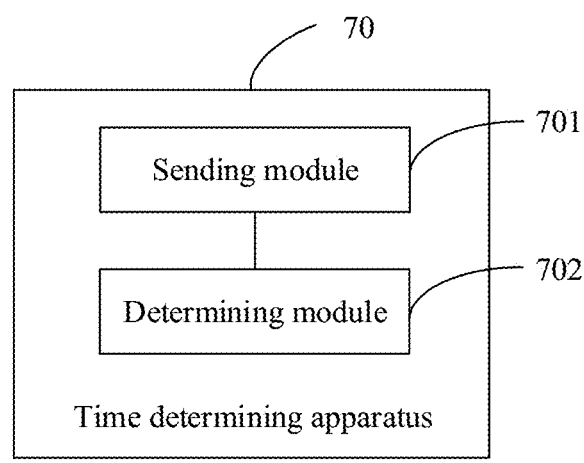
FIG. 7 is a structural diagram of another time determining apparatus according to an embodiment of this application.

Referring to FIG. 7, FIG. 7 is a structural diagram of a time determining apparatus according to an embodiment of this application. The apparatus is applied to a network device, and as shown in FIG. 7, the time determining apparatus 700 includes:

a sending module 701, configured to send a plurality of physical downlink control channels PDCCHs to a terminal on a plurality of PDCCH monitoring occasions, where the plurality of PDCCHs are PDCCH repetition transmissions, or information indicated by the plurality of PDCCHs is at least partially the same; and a determining module 702, configured to determine, based on a time of a reference PDCCH monitoring occasion in the plurality of PDCCH monitoring occasions, a start time of a first behavior corresponding to a first PDCCH and performed by the terminal.

The first PDCCH is any one PDCCH in the plurality of PDCCHs.

Optionally, the first behavior includes at least one of the following:

starting or restarting an inactivity timer;

bandwidth part BWP switching;

activating a secondary cell Scell;

uplink transmission or downlink reception as scheduled by the first PDCCH;

changing a minimum scheduling offset indication; or search space set switching.

Optionally, the inactivity timer includes at least one of the following:

a BWP inactivity timer;

a secondary cell Scell inactivity timer; or a discontinuous reception inactivity timer.

Optionally, in a case that the first behavior includes the BWP switching, or includes starting or restarting a BWP inactivity timer:

the determining module 702 is configured to determine, based on the time of the reference PDCCH monitoring occasion in the plurality of PDCCH monitoring occasions and a BWP switching delay, the start time of the first behavior corresponding to the first PDCCH and performed by the terminal, where the start time of the first behavior includes one of the following:

a switching time of the BWP switching; or a start or restart time of the BWP inactivity timer.

Optionally, the switching time of the BWP switching or the start or restart time of the BWP inactivity timer includes:

an earlier or later one of a first time and a second time; where the first time is X symbols, slots, or subframes before a start time of the discontinuous reception inactivity timer, and the second time is the time of the reference PDCCH monitoring occasion; and X corresponds to the BWP switching delay.

Optionally, the start time of the discontinuous reception inactivity timer is a start time that is determined based on the time of the reference PDCCH monitoring occasion.

Optionally, in a case that the first PDCCH includes a scheduling offset indication and the first behavior includes performing uplink transmission or downlink reception scheduled by the first PDCCH:

the determining module 702 is configured to determine a third time after the time of the reference PDCCH monitoring occasion in the plurality of PDCCH monitoring occasions as the start time of the first behavior corresponding to the first PDCCH and performed by the terminal, where a time interval between the third time and the time of the reference PDCCH monitoring occasion is an offset time indicated by the scheduling offset indication.

Optionally, in a case that the first PDCCH indicates a minimum scheduling offset indication, and the first behavior includes changing a minimum scheduling offset:

the determining module 702 is configured to determine a fourth time after the time of the reference PDCCH monitoring occasion as a start time of changing a minimum scheduling offset of the terminal to a minimum scheduling offset indicated by the first PDCCH, where the fourth time is the same as the minimum scheduling offset indicated by the first PDCCH, and a time interval between the fourth time and the time of the reference PDCCH monitoring occasion is equal to a validation time of an updated scheduling offset indication that is pre-obtained.

Optionally, the time of the reference PDCCH monitoring occasion includes one of the following:
a start symbol or end symbol of the reference PDCCH monitoring occasion;
a slot or subframe in which the reference PDCCH monitoring occasion is located; or
a next symbol, next slot, or next subframe of the reference PDCCH monitoring occasion.

Optionally, the reference PDCCH monitoring occasion is a last monitoring occasion in the plurality of PDCCH monitoring occasions; or
the reference PDCCH monitoring occasion is a last monitoring occasion in valid monitoring occasions of the plurality of PDCCH monitoring occasions.

Optionally, the plurality of PDCCH monitoring occasions are a plurality of PDCCH monitoring occasions indicated by a search space set that is configured by a network side.

The time determining apparatus provided in this embodiment of this application can implement the processes of the method embodiment of FIG. 2. To avoid repetition, details are not repeated herein. Transmission performance between the terminal and the network side can be improved.

It should be noted that the time determining apparatus in this embodiment of this application may be an apparatus, or may be a component, an integrated circuit, or a chip in a network device.

Figure 8:
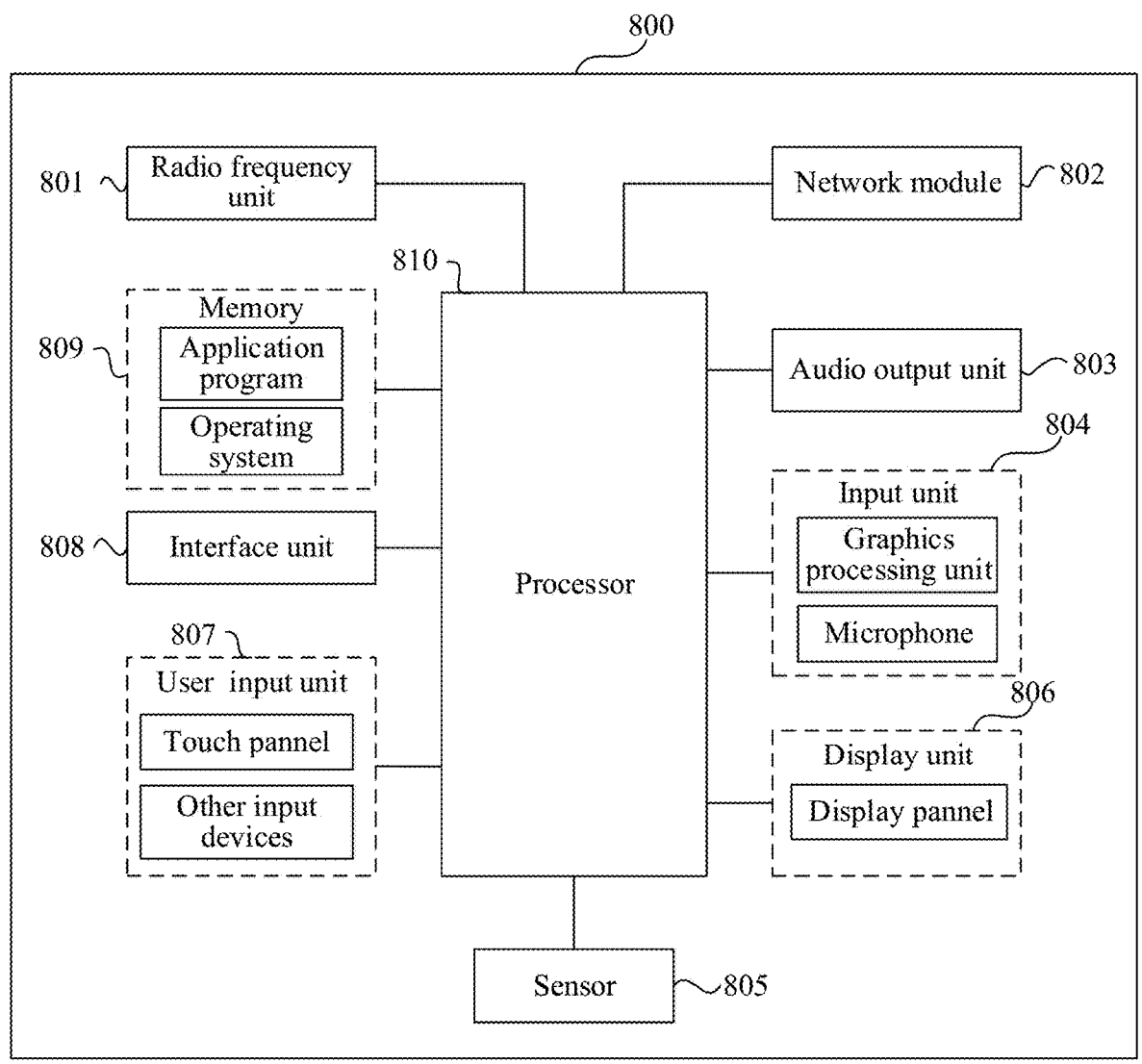
FIG. 8 is a structural diagram of a terminal according to an embodiment of this application.

FIG. 8 is a schematic diagram of a hardware structure of a terminal for implementing the embodiments of this application.

The terminal 800 includes but is not limited to components such as a radio frequency unit 801, a network module 802, an audio output unit 803, an input unit 804, a sensor 805, a display unit 806, a user input unit 807, an interface unit 808, a memory 809, and a processor 810.

Persons skilled in the art can understand that the terminal 800 may further include a power supply (for example, a battery) supplying power to the components, and the power supply may be logically connected to the processor 810 through a power management system. In this way, functions such as charge management, discharge management, and power consumption management are implemented by using the power management system. The structure of the electronic device shown in FIG. 8 does not constitute any limitation on the electronic device. The electronic device may include more or fewer components than shown in the figure, or a combination of some components, or the components disposed differently. Details are not repeated herein.

The radio frequency module 801 is configured to perform monitoring on a first physical downlink control channel PDCCH monitoring occasion in a plurality of PDCCH monitoring occasions, so as to detect a first PDCCH.

The processor 810 is configured to determine, based on a time of a reference PDCCH monitoring occasion in the plurality of PDCCH monitoring occasions, a start time of a first behavior corresponding to the first PDCCH.

The plurality of PDCCH monitoring occasions are monitoring occasions for performing repetition transmission of the first PDCCH; or
information indicated by a plurality of PDCCHs is at least partially the same, where the plurality of PDCCHs are PDCCHs transmitted on the plurality of PDCCH monitoring occasions.

Optionally, the first behavior includes at least one of the following:
starting or restarting an inactivity timer;
bandwidth part BWP switching;
activating a secondary cell Scell;
uplink transmission or downlink reception as scheduled by the first PDCCH;
changing a minimum scheduling offset indication; or
search space set switching.

Optionally, the inactivity timer includes at least one of the following:
a BWP inactivity timer;
a secondary cell Scell inactivity timer; or
a discontinuous reception inactivity timer.

Optionally, in a case that the first behavior includes the BWP switching, or includes starting or restarting a BWP inactivity timer:
the determining, based on a time of a reference PDCCH monitoring occasion in the plurality of PDCCH monitoring occasions, a start time of a first behavior corresponding to the first PDCCH includes:
determining, based on the time of the reference PDCCH monitoring occasion in the plurality of PDCCH monitoring occasions and a BWP switching delay, the start time of the first behavior corresponding to the first PDCCH, where the start time of the first behavior includes one of the following:
a switching time of the BWP switching; and
a start or restart time of the BWP inactivity timer.

Optionally, the switching time of the BWP switching or the start or restart time of the BWP inactivity timer includes:
an earlier or later one of a first time and a second time; where
the first time is X symbols, slots, or subframes before a start time of the discontinuous reception inactivity timer, and the second time is the time of the reference PDCCH monitoring occasion; and
X corresponds to the BWP switching delay.

Optionally, the start time of the discontinuous reception inactivity timer is a start time that is determined based on the time of the reference PDCCH monitoring occasion.

Optionally, in a case that the first PDCCH includes a scheduling offset indication and the first behavior includes performing uplink transmission or downlink reception scheduled by the first PDCCH:
the determining, based on a time of a reference PDCCH monitoring occasion in the plurality of PDCCH monitoring occasions, a start time of a first behavior corresponding to the first PDCCH includes:
determining a third time after the time of the reference PDCCH monitoring occasion in the plurality of PDCCH monitoring occasions as the start time of the first behavior corresponding to the first PDCCH, where a time interval between the third time and the time of the reference PDCCH monitoring occasion is an offset time indicated by the scheduling offset indication.

Optionally, in a case that the first PDCCH indicates a minimum scheduling offset indication, and the first behavior includes changing a minimum scheduling offset:

the determining, based on a time of a reference PDCCH monitoring occasion in the plurality of PDCCH monitoring occasions, a start time of a first behavior corresponding to the first PDCCH includes:
determining a fourth time after the time of the reference PDCCH monitoring occasion as a start time of changing a minimum scheduling offset of the terminal to a minimum scheduling offset indicated by the first PDCCH, where the fourth time is the same as the minimum scheduling offset indicated by the first PDCCH, and a time interval between the fourth time and the time of the reference PDCCH monitoring occasion is equal to a validation time of an updated scheduling offset indication that is pre-obtained.

Optionally, the time of the reference PDCCH monitoring occasion includes one of the following:
a start symbol or end symbol of the reference PDCCH monitoring occasion;
a slot or subframe in which the reference PDCCH monitoring occasion is located; or
a next symbol, next slot, or next subframe of the reference PDCCH monitoring occasion.

Optionally, the reference PDCCH monitoring occasion is a last monitoring occasion in the plurality of PDCCH monitoring occasions; or
the reference PDCCH monitoring occasion is a last monitoring occasion in valid monitoring occasions of the plurality of PDCCH monitoring occasions.

Optionally, the plurality of PDCCH monitoring occasions are a plurality of PDCCH monitoring occasions indicated by a search space set that is configured by a network side.

The terminal can improve transmission performance between the terminal and the network side.

Optionally, an embodiment of this application further provides a terminal, including a processor 810, a memory 809, and a program or an instruction stored in the memory 809 and capable of running on the processor 810. When the program or the instruction is executed by the processor 810, the processes of the foregoing time determining method embodiments are implemented, with the same technical effects achieved. To avoid repetition, details are not described herein again.

Figure 9:
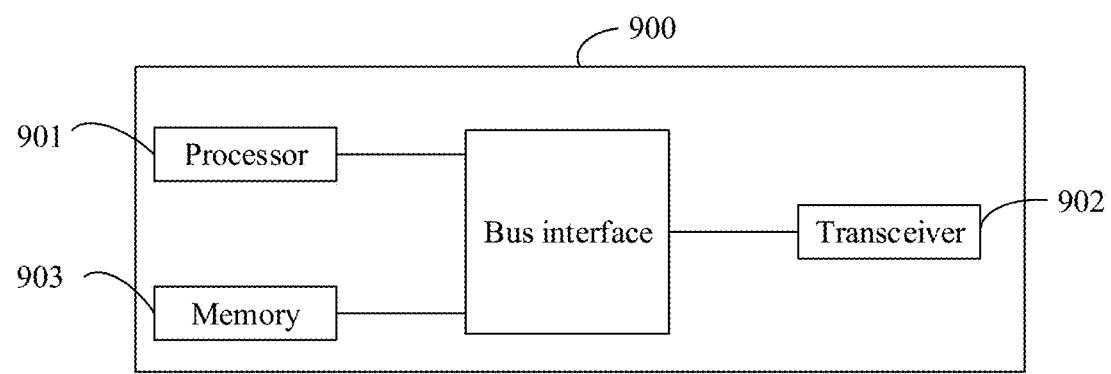
FIG. 9 is a structural diagram of a network device according to an embodiment of this application.

Referring to FIG. 9, FIG. 9 is a structural diagram of a network device according to an embodiment of this application. As shown in FIG. 9, the network device 900 includes a processor 901, a transceiver 902, a memory 903, and a bus interface.

The transceiver 902 sends a plurality of physical downlink control channels PDCCHs to a terminal on a plurality of PDCCH monitoring occasions, where the plurality of PDCCHs are PDCCH repetition transmissions, or information indicated by the plurality of PDCCHs is at least partially the same.

The processor 901 is configured to determine, based on a time of a reference PDCCH monitoring occasion in the plurality of PDCCH monitoring occasions, a start time of a first behavior corresponding to a first PDCCH and performed by the terminal.

The first PDCCH is any one PDCCH in the plurality of PDCCHs.

Optionally, the first behavior includes at least one of the following:
starting or restarting an inactivity timer;
bandwidth part BWP switching;
activating a secondary cell Scell;
uplink transmission or downlink reception as scheduled by the first PDCCH;
changing a minimum scheduling offset indication; or
search space set switching.

Optionally, the inactivity timer includes at least one of the following:
a BWP inactivity timer;
a secondary cell Scell inactivity timer; or
a discontinuous reception inactivity timer.

Optionally, in a case that the first behavior includes the BWP switching, or includes starting or restarting a BWP inactivity timer:
the determining, based on a time of a reference PDCCH monitoring occasion in the plurality of PDCCH monitoring occasions, a start time of a first behavior corresponding to a first PDCCH and performed by the terminal includes:
determining, based on the time of the reference PDCCH monitoring occasion in the plurality of PDCCH monitoring occasions and a BWP switching delay, the start time of the first behavior corresponding to the first PDCCH and performed by the terminal, where the start time of the first behavior includes one of the following:
a switching time of the BWP switching; or
a start or restart time of the BWP inactivity timer.

Optionally, the switching time of the BWP switching or the start or restart time of the BWP inactivity timer includes:
an earlier or later one of a first time and a second time; where
the first time is X symbols, slots, or subframes before a start time of the discontinuous reception inactivity timer, and the second time is the time of the reference PDCCH monitoring occasion; and
X corresponds to the BWP switching delay.

Optionally, the start time of the discontinuous reception inactivity timer is a start time that is determined based on the time of the reference PDCCH monitoring occasion.

Optionally, in a case that the first PDCCH includes a scheduling offset indication and the first behavior includes performing uplink transmission or downlink reception scheduled by the first PDCCH:
the determining, based on a time of a reference PDCCH monitoring occasion in the plurality of PDCCH monitoring occasions, a start time of a first behavior corresponding to a first PDCCH and performed by the terminal includes:
determining a third time after the time of the reference PDCCH monitoring occasion in the plurality of PDCCH monitoring occasions as the start time of the first behavior corresponding to the first PDCCH and performed by the terminal, where a time interval between the third time and the time of the reference PDCCH monitoring occasion is an offset time indicated by the scheduling offset indication.

Optionally, in a case that the first PDCCH indicates a minimum scheduling offset indication, and the first behavior includes changing a minimum scheduling offset:
the determining, based on a time of a reference PDCCH monitoring occasion in the plurality of PDCCH monitoring occasions, a start time of a first behavior corresponding to a first PDCCH and performed by the terminal includes:
determining a fourth time after the time of the reference PDCCH monitoring occasion as a start time of changing a minimum scheduling offset of the terminal to a minimum scheduling offset indicated by the first PDCCH, where the fourth time is the same as the minimum scheduling offset indicated by the first PDCCH, and a time interval between the fourth time and the time of the reference PDCCH monitoring occasion is equal to a validation time of an updated scheduling offset indication that is pre-obtained.

Optionally, the time of the reference PDCCH monitoring occasion includes one of the following:

a start symbol or end symbol of the reference PDCCH monitoring occasion;

a slot or subframe in which the reference PDCCH monitoring occasion is located; or a next symbol, next slot, or next subframe of the reference PDCCH monitoring occasion.

Optionally, the reference PDCCH monitoring occasion is a last monitoring occasion in the plurality of PDCCH monitoring occasions; or the reference PDCCH monitoring occasion is a last monitoring occasion in valid monitoring occasions of the plurality of PDCCH monitoring occasions.

Optionally, the plurality of PDCCH monitoring occasions are a plurality of PDCCH monitoring occasions indicated by a search space set that is configured by a network side.

The network device can improve transmission performance between the terminal and the network side.

The transceiver 902 is configured to receive and send data under control of the processor 901. The transceiver 902 includes at least two antenna ports.

In FIG. 9, a bus architecture may include any quantity of interconnected buses and bridges, specifically for interconnecting various circuits of one or more processors represented by the processor 901 and a memory represented by the memory 903. The bus architecture may further interconnect various other circuits such as a peripheral device, a voltage regulator, and a power management circuit. These are all well known in the art, and therefore are not further described in this specification. The bus interface provides an interface. The transceiver 902 may be a plurality of components, that is, the transceiver 902 includes a transmitter and a receiver, and provides a unit for communicating with various other apparatuses on a transmission medium. For different user equipments, the user interface 904 may also be an interface for externally or internally connecting a required device, and the connected device includes but is not limited to a mini keyboard, a display, a speaker, a microphone, a joystick, or the like.

The processor 901 is responsible for management of the bus architecture and general processing, and the memory 903 is capable of storing data that is used by the processor 901 during operation.

Optionally, an embodiment of this application further provides a network device, including a processor 901, a memory 903, and a program or an instruction stored in the memory 903 and capable of running on the processor 901. When the program or the instruction is executed by the processor 901, the processes of the foregoing time determining method embodiments are implemented, with the same technical effects achieved. To avoid repetition, details are not described herein again.

An embodiment of this application further provides a readable storage medium, where a program or an instruction is stored in the readable storage medium. When the program or the instruction is executed by a processor, the processes of the foregoing embodiments of the time determining methods on the terminal side or the network device side can be implemented, with the same technical effects achieved. To avoid repetition, details are not described herein again.

The processor is a processor in the terminal or the network device described in the foregoing embodiments. The readable storage medium includes a computer-readable storage medium, for example, a computer read-only memory (ROM), a random access memory (RAM), a magnetic disk, or an optical disc.

An embodiment of this application further provides a chip, where the chip includes a processor and a communications interface. The communications interface is coupled to the processor, and the processor is configured to run a program or an instruction to implement the processes of the foregoing embodiments of the time determining methods on the terminal side or the network device side, with the same technical effects achieved. To avoid repetition, details are not described herein again.

It should be understood that the chip mentioned in the embodiments of this application may also be referred to as a system-level chip, a system chip, a chip system, a system-on-chip, or the like.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to executing the functions in an order shown or discussed, but may also include executing the functions in a substantially simultaneous manner or in a reverse order, depending on the functions involved. For example, the described methods may be performed in an order different from that described, and steps may alternatively be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this application essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A time determining method, performed by a terminal and comprising:
   performing monitoring on a first physical downlink control channel (PDCCH) monitoring occasion in a plurality of PDCCH monitoring occasions, so as to detect a first PDCCH; and
   determining, based on a time of a reference PDCCH monitoring occasion in the plurality of PDCCH monitoring occasions, a start time of a first behavior corresponding to the first PDCCH; wherein
   the plurality of PDCCH monitoring occasions are monitoring occasions for performing repetition transmission of the first PDCCH;
   the first behavior comprises at least one of the following:
   starting or restarting an inactivity timer; or
   bandwidth part (BWP) switching;
   wherein the reference PDCCH monitoring occasion is a last monitoring occasion in the plurality of PDCCH monitoring occasions.

2. The method according to claim 1, wherein the first behavior further comprises at least one of the following:
   activating a secondary cell (Scell);
   uplink transmission or downlink reception as scheduled by the first PDCCH;
   changing a minimum scheduling offset indication; or
   search space set switching.

3. The method according to claim 1, wherein the inactivity timer comprises at least one of the following:
   a BWP inactivity timer;
   a Scell inactivity timer; or
   a discontinuous reception inactivity timer.

4. The method according to claim 3, wherein in a case that the first behavior comprises the BWP switching, or comprises starting or restarting a BWP inactivity timer:
   the determining, based on a time of a reference PDCCH monitoring occasion in the plurality of PDCCH monitoring occasions, a start time of a first behavior corresponding to the first PDCCH comprises:
   determining, based on the time of the reference PDCCH monitoring occasion in the plurality of PDCCH monitoring occasions and a BWP switching delay, the start time of the first behavior corresponding to the first PDCCH, wherein the start time of the first behavior comprises one of the following:
   a switching time of the BWP switching; or
   a start or restart time of the BWP inactivity timer.

5. The method according to claim 4, wherein the switching time of the BWP switching or the start or restart time of the BWP inactivity timer comprises:
   an earlier or later one of a first time and a second time; wherein
   the first time is X symbols, slots, or subframes before a start time of the discontinuous reception inactivity timer, and the second time is the time of the reference PDCCH monitoring occasion; and
   X corresponds to the BWP switching delay.

6. The method according to claim 5, wherein the start time of the discontinuous reception inactivity timer is a start time that is determined based on the time of the reference PDCCH monitoring occasion.

7. The method according to claim 2, wherein in a case that the first PDCCH comprises a scheduling offset indication and the first behavior comprises uplink transmission or downlink reception as scheduled by the first PDCCH:
   the determining, based on a time of a reference PDCCH monitoring occasion in the plurality of PDCCH monitoring occasions, a start time of a first behavior corresponding to the first PDCCH comprises:
   determining a third time after the time of the reference PDCCH monitoring occasion in the plurality of PDCCH monitoring occasions as the start time of the first behavior corresponding to the first PDCCH, wherein a time interval between the third time and the time of the reference PDCCH monitoring occasion is an offset time indicated by the scheduling offset indication;
   or
   wherein in a case that the first PDCCH indicates a minimum scheduling offset indication, and the first behavior comprises changing a minimum scheduling offset:
   the determining, based on a time of a reference PDCCH monitoring occasion in the plurality of PDCCH monitoring occasions, a start time of a first behavior corresponding to the first PDCCH comprises:
   determining a fourth time after the time of the reference PDCCH monitoring occasion as a start time of changing a minimum scheduling offset of the terminal to a minimum scheduling offset indicated by the first PDCCH, wherein the fourth time is the same as the minimum scheduling offset indicated by the first PDCCH, and a time interval between the fourth time and the time of the reference PDCCH monitoring occasion is equal to a validation time of an updated scheduling offset indication that is pre-obtained.

8. The method according to claim 1, wherein the time of the reference PDCCH monitoring occasion comprises one of the following:
   a start symbol or end symbol of the reference PDCCH monitoring occasion;
   a slot or subframe in which the reference PDCCH monitoring occasion is located; or
   a next symbol, next slot, or next subframe of the reference PDCCH monitoring occasion.

9. A time determining method, performed by a network device and comprising:
   sending a plurality of physical downlink control channels (PDCCHs) to a terminal on a plurality of PDCCH monitoring occasions, wherein the plurality of PDCCHs are PDCCH repetition transmissions; and
   determining, based on a time of a reference PDCCH monitoring occasion in the plurality of PDCCH monitoring occasions, a start time of a first behavior corresponding to a first PDCCH and performed by the terminal; wherein
   the first PDCCH is any one PDCCH in the plurality of PDCCHs;
   the first behavior comprises at least one of the following:
   starting or restarting an inactivity timer; or
   bandwidth part (BWP) switching;
   wherein the reference PDCCH monitoring occasion is a last monitoring occasion in the plurality of PDCCH monitoring occasions.

10. The method according to claim 9, wherein the first behavior further comprises at least one of the following:
    activating a secondary cell (Scell);
    uplink transmission or downlink reception as scheduled by the first PDCCH;
    changing a minimum scheduling offset indication; or
    search space set switching.

11. The method according to claim 9, wherein the inactivity timer comprises at least one of the following:
- a BWP inactivity timer;
- a secondary cell Scell inactivity timer; or
- a discontinuous reception inactivity timer.

12. The method according to claim 11, wherein in a case that the first behavior comprises the BWP switching, or comprises starting or restarting a BWP inactivity timer:
- the determining, based on a time of a reference PDCCH monitoring occasion in the plurality of PDCCH monitoring occasions, a start time of a first behavior corresponding to a first PDCCH and performed by the terminal comprises:
- determining, based on the time of the reference PDCCH monitoring occasion in the plurality of PDCCH monitoring occasions and a BWP switching delay, the start time of the first behavior corresponding to the first PDCCH and performed by the terminal, wherein the start time of the first behavior comprises one of the following:
- a switching time of the BWP switching; and
- a start or restart time of the BWP inactivity timer.

13. The method according to claim 12, wherein the switching time of the BWP switching or the start or restart time of the BWP inactivity timer comprises:
- an earlier or later one of a first time and a second time; wherein
- the first time is X symbols, slots, or subframes before a start time of the discontinuous reception inactivity timer, and the second time is the time of the reference PDCCH monitoring occasion; and
- X corresponds to the BWP switching delay.

14. The method according to claim 13, wherein the start time of the discontinuous reception inactivity timer is a start time that is determined based on the time of the reference PDCCH monitoring occasion.

15. The method according to claim 10, wherein in a case that the first PDCCH comprises a scheduling offset indication and the first behavior comprises uplink transmission or downlink reception as scheduled by the first PDCCH:
- the determining, based on a time of a reference PDCCH monitoring occasion in the plurality of PDCCH monitoring occasions, a start time of a first behavior corresponding to a first PDCCH and performed by the terminal comprises:
- determining a third time after the time of the reference PDCCH monitoring occasion in the plurality of PDCCH monitoring occasions as the start time of the first behavior corresponding to the first PDCCH and performed by the terminal, wherein a time interval between the third time and the time of the reference PDCCH monitoring occasion is an offset time indicated by the scheduling offset indication;

or
- wherein in a case that the first PDCCH indicates a minimum scheduling offset indication, and the first behavior comprises changing a minimum scheduling offset:
- the determining, based on a time of a reference PDCCH monitoring occasion in the plurality of PDCCH monitoring occasions, a start time of a first behavior corresponding to a first PDCCH and performed by the terminal comprises:
- determining a fourth time after the time of the reference PDCCH monitoring occasion as a start time of changing a minimum scheduling offset of the terminal to a minimum scheduling offset indicated by the first PDCCH, wherein the fourth time is the same as the minimum scheduling offset indicated by the first PDCCH, and a time interval between the fourth time and the time of the reference PDCCH monitoring occasion is equal to a validation time of an updated scheduling offset indication that is pre-obtained.

16. The method according to claim 9, wherein the time of the reference PDCCH monitoring occasion comprises one of the following:
- a start symbol or end symbol of the reference PDCCH monitoring occasion;
- a slot or subframe in which the reference PDCCH monitoring occasion is located; or
- a next symbol, next slot, or next subframe of the reference PDCCH monitoring occasion.

17. A terminal, comprising: a memory and a processor, wherein an instruction is stored in the memory and is executable by the processor, wherein when the instruction is executed by the processor, steps of a time determining method are implemented, the steps comprises:
- performing monitoring on a first physical downlink control channel (PDCCH) monitoring occasion in a plurality of PDCCH monitoring occasions, so as to detect a first PDCCH; and
- determining, based on a time of a reference PDCCH monitoring occasion in the plurality of PDCCH monitoring occasions, a start time of a first behavior corresponding to the first PDCCH; wherein
- the plurality of PDCCH monitoring occasions are monitoring occasions for performing repetition transmission of the first PDCCH;
- the first behavior comprises at least one of the following: starting or restarting an inactivity timer; or
- bandwidth part (BWP) switching;
- wherein the reference PDCCH monitoring occasion is a last monitoring occasion in the plurality of PDCCH monitoring occasions.

18. The terminal according to claim 17, wherein the first behavior further comprises at least one of the following:
- activating a secondary cell (Scell);
- uplink transmission or downlink reception as scheduled by the first PDCCH;
- changing a minimum scheduling offset indication; or
- search space set switching.

19. The terminal according to claim 17, wherein the inactivity timer comprises at least one of the following:
- a BWP inactivity timer;
- a Scell inactivity timer; or
- a discontinuous reception inactivity timer.

20. A network device, comprising: a memory and a processor, wherein an instruction is stored in the memory and is executable by the processor, wherein when the instruction is executed by the processor, the steps of the time determining method according to claim 9 are implemented.

* * * * *